United States Patent Office 3,091,080
Patented May 28, 1963

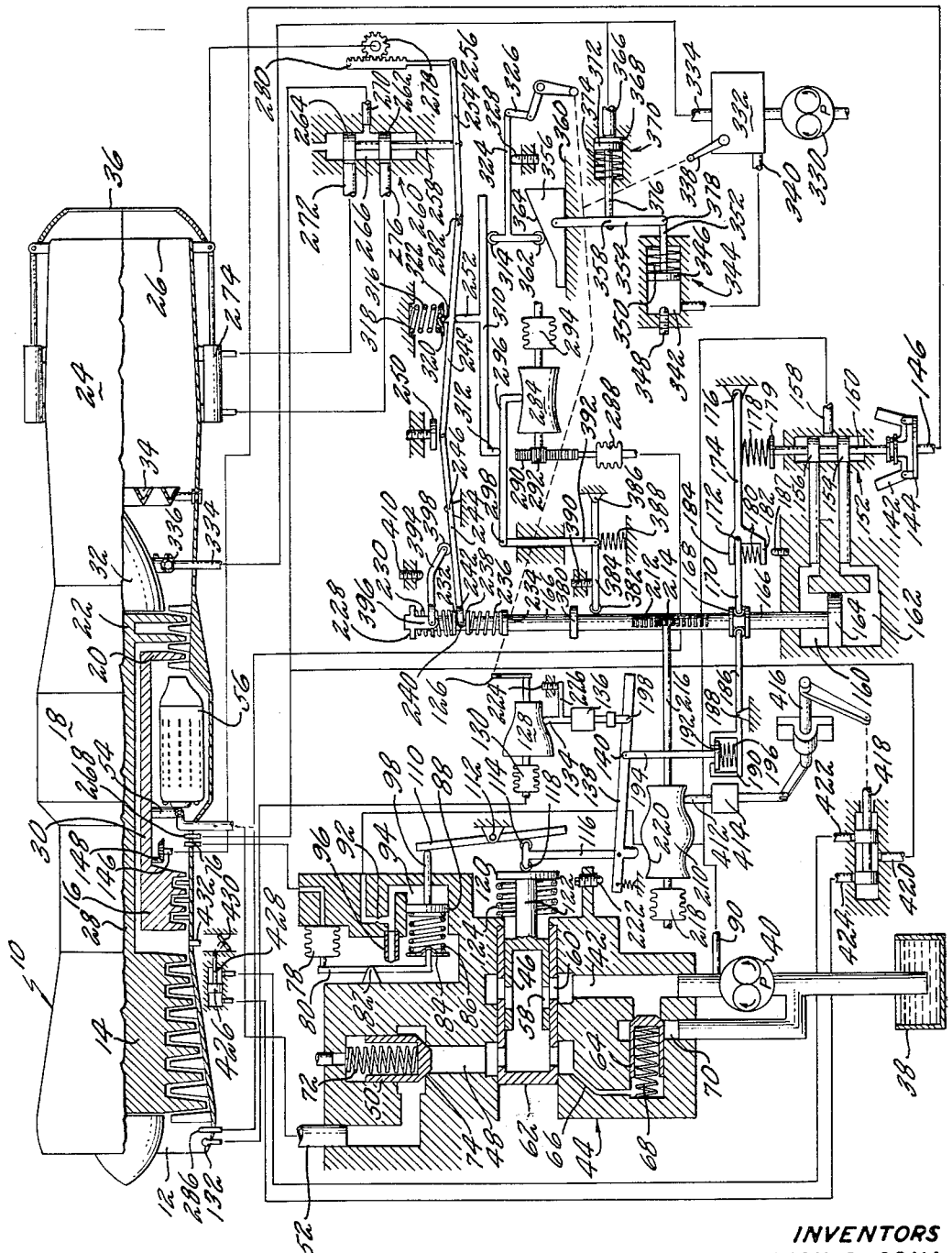

3,091,080
CONTROL SYSTEM FOR AFTERBURNING GAS TURBINE ENGINE
Hugh S. Crim, Glastonbury, and Ralph D. Ransom, Andover, Conn., assignors to United Aircraft Corporation, East Hartford, Conn., a corporation of Delaware
Filed Oct. 27, 1958, Ser. No. 770,253
15 Claims. (Cl. 60—35.6)

This invention relates to a control system for an aircraft afterburning jet engine, more particularly to a control system in which the main fuel control is combined with a continuously variable area exhaust nozzle control and a control for scheduling the operation of the compressor interstage bleed.

An object of the invention is to provide a control system in which various engine condition sensors defining engine operation are combined to schedule exhaust nozzle area in conjunction with the scheduling of main fuel flow.

Another object of the invention is to provide a control system which eliminates duplication of sensor elements and which, therefore, equally affects both the fuel and the nozzle area controls in case of failure or malfunctioning of a sensor element or a servo element. In the case of faulty operation of a sensor or servo element, it is preferable that both the fuel and the area controls are similarly affected rather than having only one of the controls suffer the failure.

Another object of the invention is to provide a control system in which exhaust nozzle area is varied with engine speed to improve the stall margin of the compressor by providing the maximum nozzle area in the region of critical compressor stall.

Still another object of the invention is to provide a control system which modulates exhaust nozzle area with engine speed to improve the accuracy of thrust control in the region of limiting mechanical speed.

Still another object of the invention is to modulate the speed setting of the exhaust nozzle area by compressor inlet pressure and temperature for operation over large altitude ranges.

Other objects and advantages will be apparent from the following specification and claims, and from the accompanying drawing which illustrates an embodiment of the invention.

In the drawing:
The single FIGURE shows an afterburning jet engine having a control system in accordance with our invention.

Referring to the drawing in detail, the jet engine is indicated generally at 10, the engine having inlet 12, low pressure compressor rotor 14, high pressure compressor rotor 16, combustion section 18, high pressure turbine rotor 20, low pressure turbine rotor 22, afterburner 24 and exhaust nozzle 26 in succession in the direction of gas flow through the engine. Compressor rotor 14 is connected to turbine rotor 22 by means of shaft 28 to form a low pressure spool. Compressor rotor 16 is connected to turbine rotor 20 by sleeve 30 to form a high pressure spool, the spool surrounding shaft 28 and being coaxial therewith. Exhaust cone 32 is mounted downstream of the last stage of turbine rotor 22 at the inlet to afterburner 24. The afterburner includes flameholder 34 and flaps 36 for varying the area of exhaust nozzle 26.

Fuel for combustion section 18 is supplied from tank 38 by pump 40 to passage 42 in fuel control 44. In the control, fuel is metered by valve 46 and then flows through passage 48, past pressurizing valve 50 and through conduit 52 to ring manifold 54 in the combustion section. Manifold 54 connects one or more burner cans 56 into which the metered fuel is discharged.

*Main Fuel Control*

Metering valve 46 in fuel control 44 includes one or more ports 58 which cooperate with similar ports 60 in liner 62 to determine the effective metering valve area. The metering valve area is varied by mechanical linkages and cams, acting through a pilot valve and servo, in response to signals of compressor discharge pressure, engine speed, compressor inlet pressure and/or temperature, and position of the pilot's control lever in a manner to be explained below. The sensing elements and actuators which provide the signals for fuel metering are further used to operate additional linkages and cams which schedule the area of the exhaust nozzle and position the compressor interstage bleeds.

The pressure drop across the metering ports is maintained constant by pressure regulating valve 64. The right end of this valve is subjected to unmetered fuel pressure in chamber 42 while the opposite end of the valve is subjected through passage 66 to the pressure of metered fuel in passage 48. Spring 68 assists metered fuel pressure and determines the actual pressure drop across metering valve 46. Pressure regulating valve 64 bypasses unmetered fuel through passage 70 to the inlet to pump 40 in maintaining the required pressure drop across metering valve 46. Pressurizing valve 50 is loaded by spring 72 against seat 74 in passage 48 to assure a minimum fuel pressure within the control to operate the servos and prevent dribbling of the fuel into burner cans 56 when the engine is shut down.

The position of metering valve 46 is varied by the product of the motion of a compressor discharge pressure actuator and the motion of a fuel flow ratio computer lever. Compressor discharge static pressure is transmitted from station 76 in engine 10 immediately downstream of high pressure compressor rotor 16 to the interior of bellows 78 in fuel control 44. The free end of the bellows is in contact with the upper end of lever 80 which rotates about pivot 82. The lower end of the lever has bell-shaped washer 84 thereon which serves as a seat for spring 86 interposed between the washer and piston 88.

Unmetered fuel is bled from passage 42 by branch conduit 90 and admitted as a motor fluid through orifice 92 to chamber 94 at the right of piston 88. Nozzle 96 is connected between orifice 92 and chamber 94 and has its opening variably controlled by lever 80 to vary the pressure in chamber 94 and thus cause shifting of piston 88. Rod 98 projects from the right face of piston 88 and contacts the upper end of multiplying lever 110 which rotates about pivot 112. The lower portion of the lever contacts rollers 114 on T-shaped link 116. Roller 118 also is mounted on the link and contacts head 120 which is connected to metering valve 46 by extension 122. Spring 124 surrounds the extension and is interposed between the fuel control casing and head 120 to load the metering valve to the right. As should be obvious, variations in compressor discharge static pressure sensed by bellows 78 rotate lever 80 to vary the flow of motor fluid through nozzle 96, and thus vary the pressure in chamber 94. Under the influence of variations in the loading of spring 86 and the resulting variations of motor fluid pressure in chamber 94, piston 88 changes its position to rotate lever 110 which, in turn, through rollers 114 and 118 shifts the position of metering valve 46. This varies the effective metering area of ports 58 and 60 and modulates fuel flow to combustion section 18 in accordance with compressor discharge pressure variations.

Adjustment of engine speed is accomplished by means of power lever 126 which imparts through a linkage system a selected speed signal to the metering valve of fuel control 44. Movement of the power lever rotates three-dimension speed setting cam 128. The cam may be translated as a function of compressor inlet temperature by bellows 130 connected thereto, the interior of the bellows being connected to temperature bulb 132 located in inlet 12 of the engine. Compressor inlet pressure rather than compressor inlet temperature could be used as the controlling variable if desired. Follower 134 is in contact with the surface of cam 128 and is connected through force amplifier 136 to the right end of fuel flow ratio computer lever 138. The opposite end of the computer lever is connected to link 116. A change in the position of cam 128 as the result of a change in speed selection, or as the result of a change in compressor inlet temperature, rotates computer lever 138 about relatively fixed pivot 140. An increased speed selection signal rotates computer lever 138 in a counterclockwise direction about pivot 140 to lower link 116, and the inclined plane surface of lever 110 contacting roller 114 permits spring 124 to move metering valve 46 to the right to increase the effective area of metering ports 58 and 60 and thus increase fuel flow to the engine. A decreased speed selection signal rotates the computer lever in a clockwise direction to raise link 116 and move metering valve 46 to the left to decrease fuel flow to the engine.

The actual speed of engine 10 is sensed by governor flyweights 142 which impart through a servo and linkage system an actual speed signal to the metering valve of fuel control 44. The flyweights are mounted on plate 144 connected to gear shaft 146 which is driven by bevel gear 148 on high pressure spool sleeve 30. Motion of the flyweights translates pilot valve 150 in speed sensing servo 152. Lands 154 and 156 on the pilot valve control the admission of a motor fluid (unmetered fuel) from branch conduit 158, connected to branch conduit 90, to chambers 160 and 162 on opposite sides of piston 164 on the lower end of speed sensor shaft 166. A feedback from the speed sensor shaft nulls the speed sensing servo by restoring pilot valve 150 to its equilibrium position. Collar 168 on speed sensor shaft 166 has a floating connection with link 170 which in turn has a hinged connection at 172 with one end of lever 174. The opposite end of the lever is pivoted at 176. Spring 178 is interposed between the mid-portion of lever 174 and flange 179 on pilot valve 150 to load the pilot valve in opposition to flyweight force. Spring 180 is mounted between lower flange 182 on the left end of lever 174 and the bottom surface of link 170. The spring normally maintains link 170 against upper flange 184 on lever 174 so that for normal operation the link and lever may be considered as a unitary member.

In operation of the speed sensing servo, an increase in the speed sensed by flyweights 142 raises pilot valve 150 to admit motor fluid to chamber 160, while at the same time venting chamber 162 to drain. The resulting pressure differential across the piston will move speed sensor shaft 166, connected to piston 164, downward. Link 170 and lever 174 will rotate in a counterclockwise direction about pivot 176 to compress spring 178 and restore pilot valve 150 to its equilibrium position. A decrease in the speed sensed by flyweight 142 will cause pilot valve 150 to be lowered to admit motor fluid to chamber 162 and drive speed sensor shaft 166 upward. The movement of the shaft rotates link 170 and lever 174 in a clockwise direction to unload spring 178 and permit the pilot valve to be returned to its null position.

Counterclockwise rotation of lever 174 in response to downward movement of speed sensor shaft 166 is limited by stop 187. When lower flange 182 on the lever contacts the stop, further downward movement of the speed sensor shaft merely rotates link 170 about hinged connection 172 and compresses spring 180 without a transfer of movement to the lever. The stop is a runaway speed protector and it terminates the feedback to speed sensing servo 152 at a predetermined engine speed. Its complete operation will be explained in more detail below.

The position of speed sensor shaft 166 is transmitted to relatively fixed pivot 140 on computer lever 138. Movement of the speed sensor shaft rotates the computer lever to adjust the position of metering valve 46 and vary fuel flow to combustion section 18 inversely as a function of actual engine speed. Collar 168 on the speed sensor shaft has a floating connection with one end of lever 186 which rotates about pivot 188. The opposite end of the lever has formed thereon receptacle 190 in which flange 192, on one end of link 194, is loosely contained. The opposite end of the link is connected to computer lever 138 to define relatively fixed pivot 140. Spring 196 in receptacle 190 loads the link and pivot in an upward direction.

When speed sensor shaft 166 moves down in response to a speed increase, lever 186 is rotated in a clockwise direction about pivot 188, and link 194 and relatively fixed pivot 140 are raised. This will rotate computer lever 138 in a clockwise direction about relatively fixed pivot 198 to raise link 116. Metering valve 46 will be shifted to the left as roller 114 climbs the inclined plane surface of lever 110 to reduce the effective area of metering ports 58 and 60 and thus decrease fuel flow to combustion section 18. When speed sensor shaft 166 is moved upward by a decrease in speed, lever 186 and link 194 move in a direction to cause counterclockwise rotation of computer lever 138 about pivot 198. Link 116 is moved downward and metering valve 46 is moved to the right to increase fuel flow to the combustion section of the engine.

In the event of a runaway speed condition of the engine, flyweights 142 force pilot valve 150 upward admitting motor fluid to chamber 160 and venting chamber 162. Speed sensor shaft 166 will be moved downward and a nulling input is fed to speed sensor servo 152 until rotation of lever 174 is terminated by stop 187. As the speed sensor shaft moved down, lever 186 was transmitting a fuel decrease signal to metering valve 46. This signal continues after the feedback signal to the servo has terminated. Thus, in the event of an overspeed, resistance to flyweight force is increased up to a point. Beyond this point there is no nulling force generated and the action of the flyweights in response to an increasing speed is to decrease fuel flow to the engine to counteract the runaway speed.

An acceleration limiter is provided to prevent unstable operation of the engine during speed transients. Acceleration cam 210 is positioned as a combined function of engine speed and compressor inlet temperature to control the rate at which the compressor rotors will accelerate upon an increase in selected speed. Rack 212 on speed sensor shaft 166 meshes with pinion 214 on shaft 216 connected to the cam so that changes in position of speed sensor shaft 166 will rotate the cam. Compressor inlet temperature responsive bellows 218 is connected to cam 210 for translating it in response to compressor inlet temperature variations. The interior of bellows 218 is not shown connected to a temperature responsive bulb at the engine inlet since in an actual embodiment of this control speed setting cam 128 and acceleration cam 210 probably would be mounted on a common shaft and translated simultaneously by a single temperature responsive element as bellows 130 and bulb 132.

When an increased speed is selected through movement of power lever 126, cam 128 is rotated so that follower 134 is raised. Force amplifier 136 will act to rotate computer lever 138 in a counterclockwise direction about pivot 140. As the computer lever rotates, link 116 descends and metering valve 46 is moved to the right to increase fuel flow to combustion section 18, which will increase engine speed. Rotation of the computer lever and opening movement of the metering valve continues until projection 220 on the computer lever contacts the surface of acceleration cam 210. This will prevent the engine speed from being increased to a value in the surging range of the compressor. However, the actual increase in engine speed is sensed by flyweights 142 to shift speed sensor shaft 166 and rotate the acceleration cam. This permits a controlled increase in the rate at which engine acceleration occurs. When the selected speed input to the metering valve balances the actual speed input to the valve, fuel flow to the engine will be at the required value to give the selected speed and equilibrium will have been established in the fuel control system.

Fuel flow ratio computer lever 138 moves between a maximum position determined by acceleration cam 210 and a minimum fixed ratio stop in response to the interaction between speed setting cam 128 and the speed sensing system. Adjustable stop 222 cooperates with the extreme left end of computer lever 138 to establish a minimum fuel rate to the engine. This stop limits the maximum clockwise movement, the fuel flow decreasing movement, of the computer lever. Adjustable stop 224 cooperates with projection 226 on follower 134 to establish a predetermined maximum selected engine speed. This stop limits the maximum selected speed signal which can be delivered to the computer lever through rotation of power lever 126.

The lost motion connection provided by receptacle 190 between lever 186 and link 194 is necessary to protect the linkage system from failure caused by overspeeding of the engine. By virtue of the connection, an overspeed condition which drives speed sensor shaft 166 to its maximum downward position would not destroy the linkage. After computer lever 138 has been driven against minimum ratio stop 222, further rotation of lever 186 merely compresses spring 196 in receptacle 190.

*Exhaust Nozzle Area Control*

Exhaust nozzle area is scheduled from signals of engine speed, compressor inlet temperature and pressure, and power lever position. The upper end of speed sensor shaft 166 has flange 228 thereon. Spring 230 surrounds the shaft between the flange and floating washer 232. The shaft also has shoulder 234 thereon with spring 236 surrounding the shaft and located between the shoulder and floating washer 238. Rollers 240 on yoke 242 connected to lever 244 ride between floating washers 232 and 238. The lever rotates about pivot 246 and the end opposite the yoke end is connected to the left end of floating lever 248. Adjustable stop 250 limits counterclockwise rotation of lever 244.

Floating lever 248 rotates about relatively fixed minimum area stop 252 and its right end is pivotably connected to arm 254 which rotates about relatively fixed pivot 256 at its right end. The midportion of arm 254 is connected to pilot valve 258 in exhaust nozzle flap actuating servo 260. The pilot valve has lands 262 and 264 thereon defining groove 266 therebetween. Compressor discharge pressure is taken from pressure station 268 between high pressure compressor rotor 16 and burner can 56 in the engine and is admitted as a motor fluid through passage 270 to groove 266 in the servo. When pilot valve 258 is raised land 264 admits motor fluid through passage 272 to the right end of flap actuating cylinders 274 which pressure will open flaps 36. When the pilot valve is lowered land 262 will admit motor fluid through passage 276 to the left end of cylinder 274 to close the flaps. A feedback to the pilot valve is provided by pinion 278 which is suitably connected to the flap actuating mechanism so that the pinion is rotated whenever flap position is changed. The pinion meshes with rack 280 which is connected to arm 254 at pivot 256. When pilot valve 258 is raised as the result of a nozzle area increase input signal, pinion 278 will rotate counterclockwise as the flaps open to lower rack 280 and pivot 256. This motion will rotate arm 254 about pin 282, the connection between the arm and floating lever 248, to lower the pilot valve and return it to its null position. The opposite action occurs when the pilot valve initially is lowered in response to a nozzle area decrease input signal.

Variations in compressor inlet temperature and compressor inlet pressure reset the position of minimum area stop 252 through nozzle area scheduling cam 284 and its follower linkage. The cam may be actuated by the same systems used to signal temperature and pressure changes to other portions of the control. Compressor inlet pressure is sensed by static pressure station 286 within engine inlet 12 and is admitted to the interior of bellows 288. The free end of the bellows is connected to rack 290 which meshes with pinion 292 connected to the shaft on which cam 284 is mounted. Expansions and contractions of the bellows will rotate the cam in accordance with compressor inlet pressure variations. Compressor inlet temperature responsive bellows 294 is connected to cam 284 for translating it in response to compressor inlet temperature variations. The interior of the bellows is not shown connected to a temperature responsive bulb since in an actual embodiment of this control area scheduling cam 284 and either one or both of speed setting and acceleration cams 128 and 210, respectively, probably would be mounted on a common shaft and translated simultaneously by a single temperature responsive element.

Follower 296 rides on the surface of cam 284 and rotates above pivot 298 as it follows the cam contour. Floating lever 310 has projection 312 in contact with a middle portion of follower 296 and pivot about roller 314 at its right end in response to movement of the follower. Minimum area stop 252 is a projection from floating lever 310 and the position of the stop will change whenever the floating lever is rotated. Spring 316 is mounted between fixed surface 318 and bell shaped washer 320, the washer being in contact with projection 322 on floating lever 248. The spring loads the floating lever against minimum area stop 252, as well as projection 312 against follower 296, and follower 296 against cam 284.

Roller 314 is mounted on one arm of T-shaped link 324. The end of the link is connected to crank 326 which in turn is connected to power lever 126. Movement of the power lever rotates the bell crank to slide the link along stop 328 and position roller 314 with respect to floating lever 310 as a function of power lever angle. Further operation of the roller and its effect as a relatively fixed pivot will be explained below.

From the above description it should be apparent that movement of speed sensor shaft 166 in accordance with variations in actual engine speed rotates lever 244, floating lever 248 and arm 254, to shift pilot valve 258 in flap actuating servo 260 to admit motor fluid to one side or the other of cylinder 274 and vary the position of flaps 36 accordingly. The actual speed input signal to the flap actuating mechanism is modulated as a function of compressor inlet temperature and compressor inlet pressure through movement of nozzle area scheduling cam 284 which shifts the position of minimum area stop 252. This in turn will actuate pilot valve 258 to vary nozzle area, and thus regulate nozzle area over large altitude ranges by using compressor inlet pressure and temperature to modulate the speed setting of the nozzle control based on engine surge and performance considerations.

*Afterburner Fuel System*

Afterburner fuel is pumped from a tank, such as tank 38, by pump 330 to afterburner fuel control 332. The control meters the fuel and the metered fuel flows through conduit 334 to ring manifold 336 in afterburner 24. Here the fuel is injected into the turbine gases entering the afterburner. Control lever 338 on the afterburner fuel control is connected with power lever 126 in order that operation of the afterburner fuel system may be coordinated with the remainder of the engine control system.

When the afterburner fuel system is set in operation, fuel is admitted to control 332 and afterburner fuel pressure is introduced through passage 340 to chamber 342 at the left end of lighting position signal indicator 344. Piston 346 in the indicator normally is maintained against stop 348 by spring 350. The pressure of the afterburner fuel in chamber 342 shifts piston 346 and rod 352, connected to the piston, to the right. Rod 352 is connected to the lower end of lever 354, the upper end of which is connected to sequence cam 356. Movement of piston 346 and rod 352 to the right rotates lever 354 in a counterclockwise direction about relatively fixed pivot 358 to slide sequence cam 356 to the left along track 360.

Roller 362 is mounted on the arm of T-link 324 opposite roller 314. During nonafterburning operation, sequence cam 356 is positioned to the right and stop 328 maintains link 324 in a position in which there is no contact between cam surface 364 and roller 362. When the sequence cam is shifted to the left the cam surface contacts the roller to raise link 324 off stop 328, the link pivoting about its connection with crank 326. This raises the pivot point of floating lever 310 in the nozzle area scheduling cam linkage. It also raises minimum area stop 252 and pilot valve 258 to introduce motor fluid to cylinder 274 to open flaps 36.

When afterburner fuel pressure has been established in conduit 334 and manifold 336, an "afterburner-on" pressure signal is supplied from conduit 334 through passage 366 to chamber 368 in afterburner-on signal indicator 370. This fuel pressure signal shifts piston 372 in the indicator to the left against the loading of spring 374. Rod 376, connected to the piston, is also connected to lever 354 at relatively fixed pivot 358. Shifting of the piston and the rod rotates lever 354 in a counterclockwise direction about pivot 378, the connection of the lever with piston rod 352, and shifts sequence cam 356 further to the left. Cam surface 364 raises link 324 still higher resulting in further opening of flaps 36.

Maximum Speed Trim

A maximum speed trim is provided which, when the engine speed reaches a predetermined limiting value, reduces the selected nozzle area as a function of the increase in speed above the predetermined value. Shoulder 380 on speed sensor shaft 166 will contact roller 382 on lever 384 as the speed sensor shaft moves down in response to an increasing actual speed. The lever rotates about pivot 386 and normally is held by spring 388 against adjustable stop 390. The midportion of the lever is connected to one end of link 392 and the opposite end of the link is connected to follower 296 at pivot 298.

Downward movement of speed sensor shaft 166 and shoulder 380 rotates lever 384 in a counterclockwise direction to lower link 392 and pivot 298. This in turn lowers projection 312 and minimum area stop 252 to energize the nozzle area actuating mechanism and close flaps 36, reducing the selected nozzle area.

Zero Speed Override

A zero speed override attached to the speed sensor shaft moves the flaps to a predetermined area when the speed sensor shaft reaches its zero speed position. Arm 394 is pivotably attached by a yoke to ears 396 on flange 228 on the speed sensor shaft. The free end of the arm supports roller 398 which rides on the top surface of lever 244. Adjustable stop 410 is positioned to contact the arm when speed sensor shaft is driven upward by a reduced or zero speed signal. Upward movement of the speed sensor shaft normally rotates lever 244 in a clockwise direction about pivot 246 which results in an increase in nozzle area. However, when arm 394 contacts stop 410 the effect of arm 394 and roller 398 on lever 244 will be to reverse the direction of rotation of the lever as the speed sensor shaft continues to rise. Counterclockwise rotation of the lever and closing action of flaps 36 is initiated and terminates when the right end of the lever contacts stop 250. Thus, the zero speed override permits the engine to operate with a nozzle area for a predetermined power output in the event of the loss of an actual engine speed signal in the control system.

Compressor Interstage Bleed

Acceleration cam 210, in addition to limiting acceleration fuel flow to the engine, schedules actuation of the compressor interstage bleeds. Follower 412 rides on the right end surface of the cam and motion of the follower in response to compressor inlet temperature and engine speed input signals to the cam is transmitted through force amplifier 414 to one arm of bell crank 416. The other arm of the bell crank is connected to pilot valve 418 controlling the admission of compressor discharge pressure through conduit 420 to conduits 422 or 424. Conduit 422 is connected to a chamber at the right of bleed valve piston 426 and conduit 424 is connected to the chamber at the left of the piston. The piston is connected by rod 428 to bleed valve 430 in pipe 432 connected to the engine at a point between compressor rotors 14 and 16. The bleed valve controls the bleeding of air from the engine through pipe 432 to avoid compressor stall. When pilot valve 418 is moved to the left motor fluid is admitted through conduit 424 to the chamber at the left of piston 426 and the chamber at the right of the piston is vented. The pressure differential across the piston moves it to the right to close bleed valve 430. When pilot valve 418 is moved to the right, motor fluid is admitted through conduit 422 to the chamber at the right of piston 426, and the piston is moved to the left to open the bleed valve.

Operation

Upon setting the engine in operation, power lever 126 is advanced to the position for the selected thrust. Considering first the fuel control alone, rotation of the lever rotates speed setting cam 128. Through follower 134 computer lever 138 is rotated in a counterclockwise direction about pivot 140 and link 116 is lowered. This permits metering valve 46 to move to the right and an increasing quantity of fuel is delivered to engine 10. The selected speed signal is biased in accordance with compressor inlet temperature through expansion and contraction of bellows 130 which translates the speed setting cam along its axis to modulate the speed signal input to the computer lever. A temperature increase will tend to reduce fuel flow and a temperature decrease will tend to increase fuel flow.

The build-up in compressor rotor speed as the engine accelerates is reflected by outward motion of governor flyweights 142 which tend to raise pilot valve 150 and admit motor fluid to drive speed sensor shaft 166 downward. Lever 174 delivers a nulling signal to the flyweight actuated servo and at the same time a fuel flow decreasing signal is delivered from the speed sensor shaft through lever 186 to computer lever 138, tending to rotate the computing lever in a clockwise direction about pivot 198. At the speed giving the selected thrust the manual input signal to the fuel control and the actual speed signal to the control have been balanced and equilibrium established in the servo and linkage system. Metering valve 46 then is in a position delivering the quantity of fuel to the engine required to produce the selected thrust.

Throughout operation of the engine a compressor discharge pressure signal is delivered to the metering valve from bellows 78 through lever 80 and its associated servo motor system to lever 110. Rotation of lever 110 adjusts the position of metering valve 46, increases in compressor discharge pressure rotating the lever in a counterclockwise direction to permit the metering valve to be moved to the right and increase fuel flow to the engine, and decreases in compressor discharge pressure rotating the lever in a clockwise direction to move the metering valve to the left and reduce fuel flow to the engine.

As the engine accelerates from its starting speed to the selected speed, operation of the engine within the compressor surge range is prevented by acceleration cam 210. If the transient from the initial speed to the selected speed would involve operation in the range of compressor instability, projection 220 on computer lever 138 contacts the surface of cam 210 and the rate at which counterclockwise rotation of the computer lever about pivot 140 occurs in response to the selected speed signal is controlled. The acceleration cam primarily is rotated about its axis through an input signal from speed sensor shaft 166, although it also is translated along its axis by compressor inlet temperature responsive bellows 218. Due to the increase in engine speed the speed senor shaft is moving down which movement will rotate the acceleration cam to permit computer lever 138 to move in a counterclockwise direction and increase engine fuel flow at a controlled rate.

It should be obvious from the foregoing description that steady state operation of the engine at any selected thrust is a function of actual speed as sensed by flyweights 142 and reflected through speed sensor shaft 166 and lever 186, compressor discharge pressure as sensed by bellows 78 and reflected through lever 110, and compressor inlet temperature as sensed by bellows 130 and reflected through speed setting cam 128. During acceleration the rate at which the engine may accelerate to a new selected speed is controlled as a function of compressor inlet temperature as sensed by bellows 218 and actual engine speed as reflected by the position of speed sensor shaft 166, the temperature signal and the speed signal acting in combination upon acceleration cam 210.

Compressor bleed valve 430 is open when the engine is at idle and relatively low speeds and the valve closes at a predetermined speed as the engine accelerates. Conversely the valve is closed during relatively high speed operation and is opened as the engine decelerates to a lower speed. The opening and the closing point of the bleed valve is controlled as a function of compressor inlet temperature sensed by bellows 218 and by actual engine speed as reflected by speed sensor shaft 166. The temperature and the speed signal act in concert through the right end surface of cam 210 upon the servo system for the bleed valve and actuate the valve in accordance with a predetermined schedule.

During starting of the engine exhaust nozzle flaps 36 are held fully open. Speed sensor shaft 166 is in an upper position when the engine is started and its associated nozzle area controlling linkage has moved pilot valve 258 up to admit motor fluid to the right end, the nozzle open end, of flap actuating cylinder 274. As the engine speed increases the speed sensor shaft moves down, rotating lever 244 in a counterclockwise direction, floating lever 248 in a clockwise direction, and arm 254 in a counterclockwise direction. This movement of lever 244 moves pilot valve 258 down to admit motor fluid to the left end of cylinder 274 to gradually close the flaps. Whenever flaps 36 are moved the feedback from the flaps, through pinion 278 and rack 280 to pilot valve 258, is attempting to null out the servo system and would do so except for the continuous nozzle area decrease signal delivered to the pilot valve from the speed sensor shaft.

At a predetermined speed lever 244 has been rotated to a position where its right end contacts stop 250, and further closing of the flaps due to continued downward travel of the speed sensor shaft is prevented. Basically, the nozzle area control functions to maintain a maximum area at low speeds to avoid engine surge while at high speeds the area is scheduled for reasons of engine performance. The nozzle area transition from a maximum area at starting speeds to a predetermined smaller area for operation at higher speeds is provided to obtain a smooth, continuous change of thrust with speed.

While nozzle area responds to an increasing speed as described above, primary scheduling of nozzle area is done as a function of compressor inlet pressure and temperature. Compressor inlet pressure is sensed by bellows 288 and compressor inlet temperature is sensed by bellows 294. The output signal from each bellows combines to position nozzle area scheduling cam 284 and movement of this cam acts through follower 296 to position stop 252. Changes in the position of the stop rotate floating lever 248 about its connection with lever 244 to rotate arm 254 and displace pilot valve 258. Displacement of the pilot valve will admit motor fluid to the flap actuating cylinder to open or close flaps 36 in accordance with the relative position change of stop 252 as determined by cam 284.

Primary actuation of flaps 36 through nozzle area scheduling cam 284 occurs at relatively high engine speeds after lever 244 has been immobilized by stop 250. If, during such high speed operation, the engine should tend to overspeed shoulder 380 on speed sensor shaft 166 will contact roller 382 and lever 384 will be rotated in a counterclockwise direction. This will lower link 392 which in turn causes a lowering of stop 252 as well as a lowering of pilot valve 258. A nozzle decrease area signal then will be delivered to cylinder 274 and flap area will be decreased in accordance with the overspeed condition.

When afterburner operation of the engine is desired power lever 126 is advanced into the afterburning range. In this range control lever 338 is actuated to set the afterburner fuel system in operation and to schedule the fuel metered by afterburner fuel control 332. As afterburner fuel starts to flow, a fuel pressure signal is delivered to lighting position signal indicator 344 and sequence cam 356 is moved to the left to a first position. In this position the sequence cam contacts roller 362 to raise link 324 which in turn raises floating lever 310 and stop 252. As the stop is raised flap actuating servo 260 is operated to establish an increased nozzle area. When afterburner fuel has filled manifold 336 a pressure signal is delivered to afterburner-on signal indicator 370 and sequence cam 356 is moved to the left to a second position. The new position of the cam further raises stop 252 and further increases nozzle area to the desired value for afterburning operation. Movement of power lever 126 in the afterburner range actuates crank 326 and T-link 324 to move roller 362 along ramp 364 on the sequence cam to vary the selected nozzle area in accordance with power lever position.

It is understood that the invention is not limited to the specific embodiments herein illustrated and described, but may be used in other ways without departure from its spirit as defined by the following claims.

We claim:

1. In a control system for a gas turbine engine having a variable area exhaust nozzle, speed sensor means positioned as a function of engine speed, first means actuated by said speed sensor means for controlling the area of said exhaust nozzle, means preventing speed actuated operation of said first means over a predetermined range of engine speeds above a predetermined engine speed, and second means actuated by said speed sensor means at a speed higher than said predetermined range of engine speeds for reducing the area of said exhaust nozzle as a function of an increase in engine speed at a speed higher than said predetermined range of engine speeds.

2. A control system for a gas turbine engine as in claim 1 including a fuel metering valve for regulating fuel flow to said engine, means actuated by said speed sensor for varying the area of said metering valve, engine driven governor means connected to said speed sensor, feedback means from said speed sensor means to said governor means, and means for terminating said feedback means upon a runaway speed condition of said engine.

3. A control system for a gas turbine engine as in claim 1 including third means actuated by said speed sensor means and acting upon said first means to establish a predetermined exhaust nozzle area upon loss of the engine speed signal.

4. A variable area exhaust nozzle control system for a gas turbine engine, said system including speed sensor means positioned as a function of engine speed, means operatively connected with said speed sensor means for controlling the area of said nozzle and means responsive to compressor inlet temperature and compressor inlet pressure for scheduling the area of said nozzle to change with changes in compressor inlet temperature and pressure.

5. An afterburning gas turbine engine control system, said system including a fuel metering valve and a variable area exhaust nozzle, engine speed, pressure and temperature responsive means for varying the area of said fuel metering valve, governor means connected to and driven by said engine, speed sensor means operatively connected to said governor means, lever means operatively connected to and actuated by said speed sensor means for controlling the area of said exhaust nozzle, engine pressure and temperature responsive means acting upon said lever means to schedule the area of said exhaust nozzle, means acting upon said lever means for establishing a first area of said exhaust nozzle upon the initiation of afterburning operation and means further acting upon said lever means for establishing a second area of said exhaust nozzle for afterburning operation.

6. A gas turbine engine control system, said system including a fuel metering valve and a variable area exhaust nozzle, engine speed, pressure and temperature responsive means for varying the area of said fuel metering valve, governor means connected to and driven by said engine, speed sensor means operatively connected to said governor means, lever means operatively connected to and actuated by said speed sensor means for controlling the area of said exhaust nozzle, engine pressure and temperature responsive means acting upon said lever means to schedule the area of said exhaust nozzle, means actuated by said speed sensor means and acting upon said lever means to reduce the area of said exhaust nozzle as a function of an increase in engine speed above a preselected value and means operatively connected with said speed sensor means and acting upon said lever means to establish a predetermined area of said exhaust nozzle upon failure of said governor means.

7. A gas turbine engine control system, said system including a fuel metering valve and a variable area exhaust nozzle, governor means connected to and driven by said engine, speed sensor means operatively connected to said governor means, means actuated by said speed sensor means for varying the area of said fuel metering valve as a function of engine speed, lever means operatively connected to and actuated by said speed sensor means for controlling the area of said exhaust nozzle, engine pressure and temperature responsive means acting upon said lever means to schedule the area of said exhaust nozzle, means actuated by said speed sensor means and acting upon said lever means to reduce the area of said exhaust nozzle as a function of an increase in engine speed above a preselected value and means operatively connected with said speed sensor means and acting upon said lever means to establish predetermined area of said exhaust nozzle upon failure of said governor means.

8. An afterburning gas turbine engine control system, said system including a fuel metering valve and a variable area exhaust nozzle, governor means connected to and driven by said engine, speed sensor means operatively connected to said governor means, means actuated by said speed sensor means for varying the area of said fuel metering valve as a function of engine speed, means actuated by said speed sensor means for limiting opening movement of said fuel metering valve, lever means operatively connected to and actuated by said speed sensor means for controlling the area of said exhaust nozzle, engine pressure and temperature responsive means acting upon said lever means to schedule the area of said exhaust nozzle, means actuated by said speed sensor means and acting upon said lever means to reduce the area of said exhaust nozzle as a function of an increase in engine speed above a preselected value, means operatively connected with said speed sensor means and acting upon said lever means to establish a predetermined area of said exhaust nozzle upon failure of said governor means, means acting upon said lever means for establishing a first exhaust nozzle area upon the initiation of afterburning operation and means further acting upon said lever means for establishing a second exhaust nozzle area for afterburner operation.

9. An afterburning gas turbine engine control system, said system including a fuel metering valve, an engine bleed valve and a variable area exhaust nozzle, governor means connected to and driven by said engine, speed sensor means operatively connected to said governor means, means actuated by said speed sensor means for varying the area of said fuel metering valve as a function of engine speed, means actuated by said speed sensor means for limiting opening movement of said fuel metering valve, means actuated by said speed sensor means for controlling said engine bleed valve, lever means operatively connected to and actuated by said speed sensor means for controlling said exhaust nozzle, means actuated by said speed sensor means and acting upon said lever means to reduce the area of said exhaust nozzle as a function of an increase in engine speed above a preselected value, means operatively connected with said speed sensor means and acting upon said lever means to establish a predetermined area of said exhaust nozzle upon failure of said governor means, means acting upon said lever means for establishing a first exhaust nozzle area upon the initiation of afterburning operation and means further acting upon said lever means for establishing a second exhaust nozzle area for afterburning operation.

10. An afterburning gas turbine engine control system, said system including a fuel metering valve, an engine bleed valve and a variable area exhaust nozzle, governor means connected to and driven by said engine, speed sensor means operatively connected to said governor means, means actuated by said speed sensor means for varying the area of said fuel metering valve as a function of engine speed, means actuated by said speed sensor means for controlling said engine bleed valve, lever means operatively connected to and actuated by said speed sensor means for controlling the area of said exhaust nozzle, engine pressure and temperature responsive means acting upon said lever means to schedule the area of said exhaust nozzle, means actuated by said speed sensor means and acting upon said lever means to reduce the area of said exhaust nozzle as a function of an increase in engine speed above a preselected value, means operatively connected with said speed sensor means and acting upon said lever means to establish a predetermined exhaust nozzle area upon failure of said governor means, means acting upon said lever means for establishing a first exhaust nozzle area upon the initiation of afterburning operation and means further acting upon said lever means for establishing a second position for afterburner operation.

11. An afterburning gas turbine engine control system, said system including a fuel metering valve, an engine bleed valve and a variable area exhaust nozzle, manually actuated means and engine pressure and temperature responsive means for varying the area of said fuel metering valve, governor means connected to and driven by said engine, speed sensor means operatively connected to said governor means, means actuated by said speed sensor means for varying the area of said fuel metering valve inversely as a function of engine speed, means actuated by said speed sensor means for limiting opening movement of said fuel metering valve, means actuated by said speed sensor means for controlling said engine bleed valve, lever means operatively connected to and actuated by said speed sensor means for controlling said exhaust nozzle, engine pressure responsive means acting upon said lever means to schedule the area of said exhaust nozzle, means actuated by said speed sensor means and acting upon said lever means to reduce the area of said exhaust nozzle as a function of an increase in engine speed above a preselected value, means operatively connected with said speed sensor means and acting upon said lever means to establish a predetermined exhaust nozzle area upon failure of said governor means, means acting upon said lever means for establishing a first exhaust nozzle area upon the initiation of afterburning operation and means further acting upon said lever means for establishing a second exhaust nozzle area for afterburner operation.

12. An afterburning gas turbine engine control system, said system including a fuel metering valve, an engine bleed valve and a variable area exhaust nozzle, manually actuated means and engine pressure and temperature responsive means for varying the area of said fuel metering valve, governor means connected to and driven by said engine, speed sensor means operatively connected to said governor means, means actuated by said speed sensor means for varying the area of said fuel metering valve inversely as a function of engine speed, means actuated by said speed sensor means for limiting opening movement of said fuel metering valve, engine temperature responsive means for further limiting opening movement of said fuel metering valve, means actuated by said speed sensor means for controlling said engine bleed valve, engine temperature responsive means for further controlling said engine bleed valve, lever means operatively connected to and actuated by said speed sensor means for controlling said exhaust nozzle, engine pressure and temperature responsive means acting upon said lever means to schedule the area of said exhaust nozzle, means acting upon said lever means for establishing a first exhaust nozzle area upon the initiation of afterburning operation and means further acting upon said lever means for establishing a second exhaust nozzle area for afterburner operation.

13. A gas turbine engine control system, said system including a fuel metering valve, an engine bleed valve and a variable area exhaust nozzle, manually actuated means and engine pressure and temperature responsive means for varying the area of said fuel metering valve, governor means connected to and driven by said engine, speed sensor means operatively connected to said governor means, means actuated by said speed sensor means for varying the area of said fuel metering valve inversely as a function of engine speed, means actuated by said speed sensor means for limiting opening movement of said fuel metering valve, engine temperature responsive means for further limiting opening movement of said fuel metering valve, means actuated by said speed sensor means for controlling said engine bleed valve, engine temperature responsive means for further controlling said engine bleed valve, lever means operatively connected to and actuated by said speed sensor means for controlling said exhaust nozzle, engine pressure and temperature responsive means acting upon said lever means to schedule the area of said exhaust nozzle, means actuated by said speed sensor means and acting upon said lever means to reduce the area of said exhaust nozzle as a function of an increase in engine speed above a preselected value and means operatively connected with said speed sensor means and acting upon said lever means to establish a predetermined exhaust nozzle area upon failure of said governor means.

14. An afterburning gas turbine engine control system, said system including a fuel metering valve, an engine bleed valve and a variable area exhaust nozzle, manually actuated means and engine pressure and temperature responsive means for varying the area of said fuel metering valve, governor means connected to and driven by said engine, speed sensor means operatively connected to said governor means, means actuated by said speed sensor means for varying the area of said fuel metering valve inversely as a function of engine speed, means actuated by said speed sensor means for limiting opening movement of said fuel metering valve, engine temperature responsive means for further limiting opening movement of said fuel metering valve, means actuated by said speed sensor means for controlling said engine bleed valve, engine temperature responsive means for further controlling said engine bleed valve, lever means operatively connected to and actuated by said speed sensor means for controlling said exhaust nozzle, engine pressure and temperature responsive means acting upon said lever means to schedule the area of said exhaust nozzle, means actuated by said speed sensor means and acting upon said lever means to reduce the area of said exhaust nozzle as a function of an increase in engine speed above a preselected value, means operatively connected with said speed sensor means and acting upon said lever means to establish a predetermined exhaust nozzle area upon failure of said governor means, means acting upon said lever means for establishing a first exhaust nozzle area upon the initiation of afterburning operation and means further acting upon said lever means for establishing a second exhaust nozzle area for afterburner operation.

15. An afterburning gas turbine engine control system, said system including a fuel metering valve, an engine bleed valve and a variable area exhaust nozzle, manually actuated means and engine pressure and temperature responsive means for varying the area of said fuel metering valve, governor means connected to and driven by said engine, speed sensor means operatively connected to said governor means and including feedback means to said governor means, means actuated by said speed sensor means for varying the area of said fuel metering valve inversely as a function of engine speed, means actuated by said speed sensor means for limiting opening movement of said fuel metering valve, engine temperature responsive means for further limiting opening movement of said fuel metering valve, means actuated by said speed sensor means for controlling said engine bleed valve, engine temperature responsive means for further controlling said engine bleed valve, lever means operatively connected to and actuated by said speed sensor means for controlling said exhaust nozzle, engine pressure and temperature responsive means acting upon said lever means to schedule the area of said exhaust nozzle, means actuated by said speed sensor means and acting upon said lever means to reduce exhaust nozzle area as a function of an increase in engine speed above a preselected value, means operatively connected with said speed sensor means and acting upon said lever means to establish a predetermined exhaust nozzle area upon failure of said governor means, means acting upon said lever means for establishing a first exhaust nozzle area upon the initiation of afterburning operation, means further acting upon said lever means for establishing a second exhaust nozzle area for afterburner operation and means for terminating said feedback means to said governor means upon a runaway speed condition of said engine.

References Cited in the file of this patent

UNITED STATES PATENTS

| | | |
|---|---|---|
| 2,520,434 | Robson | Aug. 29, 1950 |
| 2,785,848 | Lombard et al. | Mar. 19, 1957 |
| 2,857,739 | Wright | Oct. 28, 1958 |
| 2,873,576 | Lombard | Feb. 17, 1959 |
| 2,931,168 | Alexander | Apr. 5, 1960 |
| 2,933,887 | Davies | Apr. 26, 1960 |
| 2,944,387 | Hall | July 12, 1960 |
| 2,955,416 | Hegg | Oct. 11, 1960 |
| 2,966,140 | Dungan | Dec. 27, 1960 |
| 2,979,889 | Hurtle | Apr. 18, 1961 |
| 3,021,674 | Zeisloft | Feb. 20, 1962 |
| 3,023,801 | Kinney | Mar. 6, 1962 |